(12) United States Patent (10) Patent No.: US 9,148,316 B2
Mukherjee (45) Date of Patent: Sep. 29, 2015

(54) DECISION FEEDBACK EQUALIZER

(71) Applicant: TEXAS INSTRUMENTS INCORPORATED, Dallas, TX (US)

(72) Inventor: Tonmoy Shanker Mukherjee, Atlanta, GA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 72 days.

(21) Appl. No.: 13/937,925

(22) Filed: Jul. 9, 2013

(65) Prior Publication Data

US 2015/0016496 A1 Jan. 15, 2015

(51) Int. Cl.
| | |
|---|---|
| *H04B 1/38* | (2015.01) |
| *H04L 5/16* | (2006.01) |
| *H04L 27/10* | (2006.01) |
| *H04L 27/18* | (2006.01) |
| *H04L 25/03* | (2006.01) |

(52) U.S. Cl.
CPC ... *H04L 25/03057* (2013.01); *H04L 2025/0349* (2013.01); *H04L 2025/03617* (2013.01)

(58) Field of Classification Search
CPC .................. H04L 25/03057; H04L 2025/0349; H04L 2025/03617; H04L 2025/03503; H04L 25/03038
USPC .......................................................... 375/233
See application file for complete search history.

(56) References Cited

U.S. PATENT DOCUMENTS

| | | | | |
|---|---|---|---|---|
| 7,822,114 | B2* | 10/2010 | Bulzacchelli et al. | 375/233 |
| 8,126,045 | B2* | 2/2012 | Bulzacchelli et al. | 375/233 |
| 2006/0188043 | A1* | 8/2006 | Zerbe et al. | 375/346 |
| 2012/0269255 | A1* | 10/2012 | Pelteshki et al. | 375/233 |
| 2013/0308694 | A1* | 11/2013 | Amamiya | 375/233 |

OTHER PUBLICATIONS

Grozing, "Sampling Receive Equalizer with Bit-Rate Flexible Operation up to 10 Gbit/s," Proceedings of the 32nd European Solid-State Circuits Conference, 2006, ESSCIRC 2006, Sep. 2006 pp. 516-551.*

Kenney, "A parallel architecture for multilevel decision feedback equalization," IEEE Transactions on Magnetics, vol. 34, Issue 2, Part 2, Mar. 1998 pp. 588-59.*

Krishna, "A multigigabit backplane transceiver core in 0.13-1Jm CMOS with a power-efficient equalization architecture," IEEE Journal of Solid-State Circuits, pp. 2658-2666, vol. 40, Issue: 12, Dec. 2005.*

(Continued)

*Primary Examiner* — Shuwang Liu
*Assistant Examiner* — Nader Bolourchi
(74) *Attorney, Agent, or Firm* — Alan A. R. Cooper; Frank D. Cimino

(57) ABSTRACT

A decision feedback equalizer (DFE) circuit includes a first equalization path and a second equalization path. Each equalization path includes a summing node, a first latch, a second latch, a first feedback path, and a second feedback path. The first latch is configured to latch data received from the summing node. The second latch is configured to latch data received from the first latch. The first feedback path is configured to receive data from the second latch and to provide data to the summing node of the equalization path. The second feedback path is configured to receive data from the first latch and to provide data to the summing node of the other equalization path. The second feedback path provides up to a symbol interval for propagation of data between the summing nodes.

18 Claims, 4 Drawing Sheets

(56) References Cited

OTHER PUBLICATIONS

Didem Z. Turker; A 19Gb/s 38mW 1-Tap Speculative DFE Receiver in 90nm CMOS; 22009 Symposium on VLSI Circuits Digest of Technical Papers; p. 216-217 (2 pgs).

Koon-Lun Jackie Wong; A 5-mW 6-Gb/s Quarter-Rate Sampling Receiver With a 2-Tap DFE Using Soft Decisions; 2007 IEEE Journal of Solid-State Circuits, vol. 42, No. 4 (8 pgs).

* cited by examiner

DECISION FEEDBACK EQUALIZER

BACKGROUND

As technology advances and the processing capabilities of digital computing devices increases, higher bandwidth networks are needed to interconnect the computing devices and facilitate use of the increasing computing power. However increasing network data rates can be problematic due to limited channel bandwidth. The bandwidth of an electrical channel (e.g., a transmission line) may be reduced by physical effects, such as skin effect, dielectric loss, and reflections due to impedance discontinuities.

Limited channel bandwidth can cause a transmitted pulse to spread across more than one unit interval, and as a result, the received signal may suffer from inter-symbol interference. Equalization functions may be added the input and/or output circuitry of a network to compensate for signal distortions resulting from limited channel.

A decision feedback equalizer (DFE) is a nonlinear equalizer that is well suited to equalizing a high-loss channel. Unlike linear equalizers, the DFE is able to flatten channel response and reduce signal distortion without amplifying noise or crosstalk, which is an important advantage when equalizing a high loss channel.

In a DFE, previously received bits are weighted, fed back, and added to the received input signal. If the magnitudes and polarities of the weights applied to the previously received bits are properly adjusted to match the channel characteristics, the inter-symbol interference from the previous bits in the data stream will be cancelled, and the bits can be detected with a low bit error rate.

SUMMARY

Novel approaches to a half-rate decision feedback equalizer (DFE) are disclosed herein. In one implementation, a DFE circuit includes a first equalization path and a second equalization path. Each equalization path includes a summing node, a first latch, a second latch, a first feedback path, and a second feedback path. The first latch is configured to latch data received from the summing node. The second latch is configured to latch data received from the first latch. The first feedback path is configured to receive data from the second latch and to provide data to the summing node of the equalization path. The second feedback path is configured to receive data from the first latch and to provide data to the summing node of the other equalization path. The second feedback path provides up to a symbol interval for propagation of data between the summing nodes.

In another implementation a DFE circuit includes a first summing node, a first latch, a second latch, and a third latch. The first summing node is coupled to a data input of the circuit. The first latch is configured to receive data from the first summing node. The second latch configured to receive data from the first latch. The third latch configured to receive data from the second latch and to provide data to the first summing node. The first summing node is configured to equalize a symbol received from the data input of the circuit by combining the data provided by the third latch with the symbol. The data provided by the third latch is delayed by two symbol intervals for combination with the symbol.

In a further implementation, a DFE circuit includes parallel equalization paths configured to equalize alternate bits of an input data stream. A first of the equalization paths includes a summing node, a first latch, and a second latch. The first latch is configured to latch data received from the summing node. The second latch is configured to latch data received from the first latch. The first latch is further configured to transparently pass the data received from the summing node during a first half of every even numbered bit interval and to latch the data when not transparent. The second latch is further configured to latch data received from the first latch during the first half of the every even numbered bit interval and to transparently pass data from the first latch when not latching the data.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . "

The term "couple" or "couples" is intended to mean either an indirect or direct electrical connection. Thus, if a first device couples to a second device, that connection may be through a direct electrical connection, or through an indirect electrical connection via other devices and connections.

The recitation "based on" is intended to mean "based at least in part on." Therefore, if X is based on Y, X may be based on Y and any number of other factors.

The terms "approximate," "approximately," and the like are intended to mean within ±10% of a stated value.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In a conventional full-rate decision feed-back equalizer (DFE), proper operation requires that feedback loop delay be less than one unit interval (a unit interval is a symbol interval or symbol duration) which makes implementation increasingly difficult as data rates increase. Conventional half-rate DFE architectures may be subject to the sample feedback delay requirements as full rate architectures. More complex half rate DFE architectures include sample and hold circuitry that relaxes the feedback delay requirements, but implementing suitable sample and hold circuitry can be difficult and expensive.

The DFE circuits disclosed herein employ a half-rate architecture and cross-coupled equalization paths. Some implementations include relaxed feedback timing requirements that allow equalization of higher rate data streams than would be possible with conventional DFE architectures. Alternatively, the DFE architectures disclosed herein allow implementation of DFEs for equalizing high rate data streams using semiconductor processes that may be unsuitable for implementing conventional DFEs to equalize such data streams.

Figure 1:
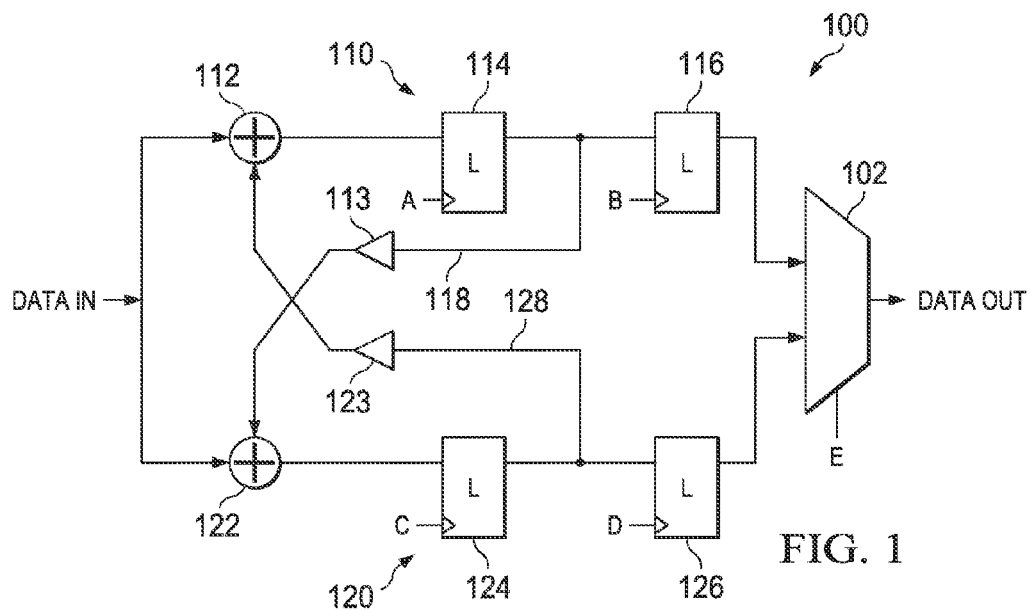
FIG. 1 shows a schematic diagram of a decision feedback equalizer (DFE) in accordance with principles disclosed herein.

FIG. 1 shows a schematic diagram of a DFE circuit 100 in accordance with principles disclosed herein. The DFE circuit 100 includes parallel equalization paths 110 and 120 with a single feedback path in each equalization path. Alternate symbols of the data stream received at the input of the DFE circuit 100 are processed in each of the equalization paths 110, 120.

The equalization path 110 includes a summing node 112, and latches 114 and 116. The equalization path 120 includes a summing node 122, and latches 124 and 126. Each of the summing nodes 112, 122 receives data from the input of the DFE circuit 100, and includes circuitry for summing the input data with feedback data. In equalization path 110, the latch 114 receives as input summed data from the summing node 112 and provides output 118 for input to the latch 116. Similarly, in equalization path 120, the latch 124 receives as input summed data from the summing node 122 and provides output 128 for input to the latch 126. Outputs of latches 116 and 126 are provided to a multiplexer 102, or equivalent selection circuitry, that selects/routes the outputs of the latches 116, 126 to the output of the DFE circuit 100.

The output 118 of latch 114 is fed back into summing node 122 through a feedback tap including a gain stage 113 for combination (summation) with data input to the DFE circuit 100. Similarly, the output 128 of latch 124 is fed back into summing node 112 through a feedback tap including gain stage 123. The gain stages 113, 123 scale the outputs 113, 123 for combination with the data input to the circuit 100. The polarities of the feedback signals provided from each of the gain stages 113, 123 can be changed in the gain stage, in the summing node, or elsewhere in the DFE circuit 100.

Figure 2:
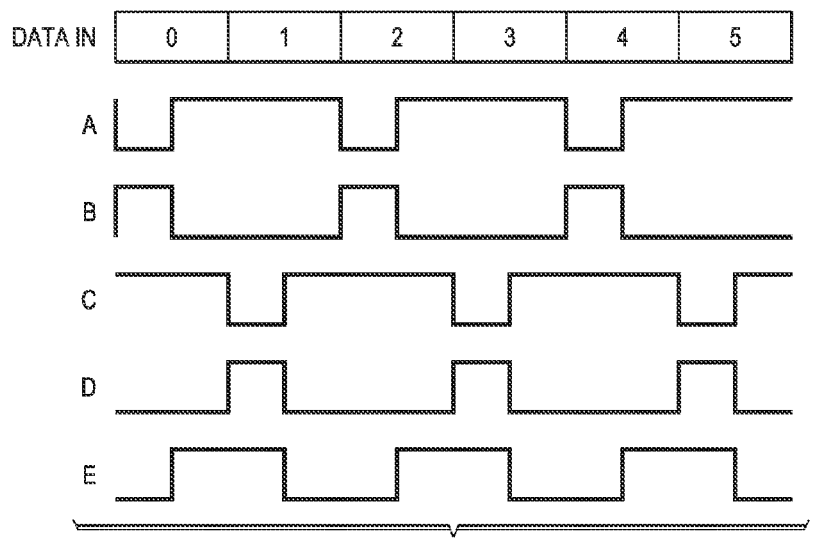
FIG. 2 shows a diagram of timing signals applicable to the DFE of FIG. 1.

FIG. 2 shows the control signals applied to the DFE circuit 100. The clock signals A, B, C. and D are provided to the latches 112, 114, 122, and 124 respectively. The signal E controls selection of the outputs of latches 114 and 124 to be provided as output of the circuit 100. The unit intervals defining the symbol duration of the input data are numbered for reference. Clock signal A causes latch 114 to transparently pass signal from input to output of the latch 114 during the initial half of even numbered unit intervals, and to latch the signal present at the input of the latch 114 though the end of the subsequent odd-numbered unit interval. Clock signal B causes latch 116 to latch data provided from latch 114 during the initial half of even numbered unit intervals (while latch 114 is transparent) and to transparently pass data provided from the latch 114 through the end of the subsequent odd-numbered unit interval. The designations odd and even are used herein to describe the alternate (every other) unit interval processing in an equalization path and are not intended to indicate that a particular equalization path must process odd or even unit intervals.

Driven by clock signals C and D, latches 124 and 126 operate with respect to odd numbered unit intervals in a manner similar to latches 114 and 126. Accordingly, data latched by latch 114 in an even numbered unit interval is fed back into the summing node 122 to equalize the data input to the circuit 100 during the subsequent odd numbered unit interval. Similarly, data latched by latch 124 in an odd numbered unit interval is fed back into the summing node 112 to equalize the data input to the circuit 100 during the subsequent even numbered unit interval. Equalized data are latched in and provided by the latches 116, 126 to the multiplexer 102 which selects the equalized data in accordance with selection control signal E to generate the data output of the DFE circuit 100.

Thus, in the DFE circuit 100, each equalization path 110, 120 corrects alternate (every other) symbols, reducing the processing rate in each path by half with respect to a full rate DFE architecture.

Figure 3:
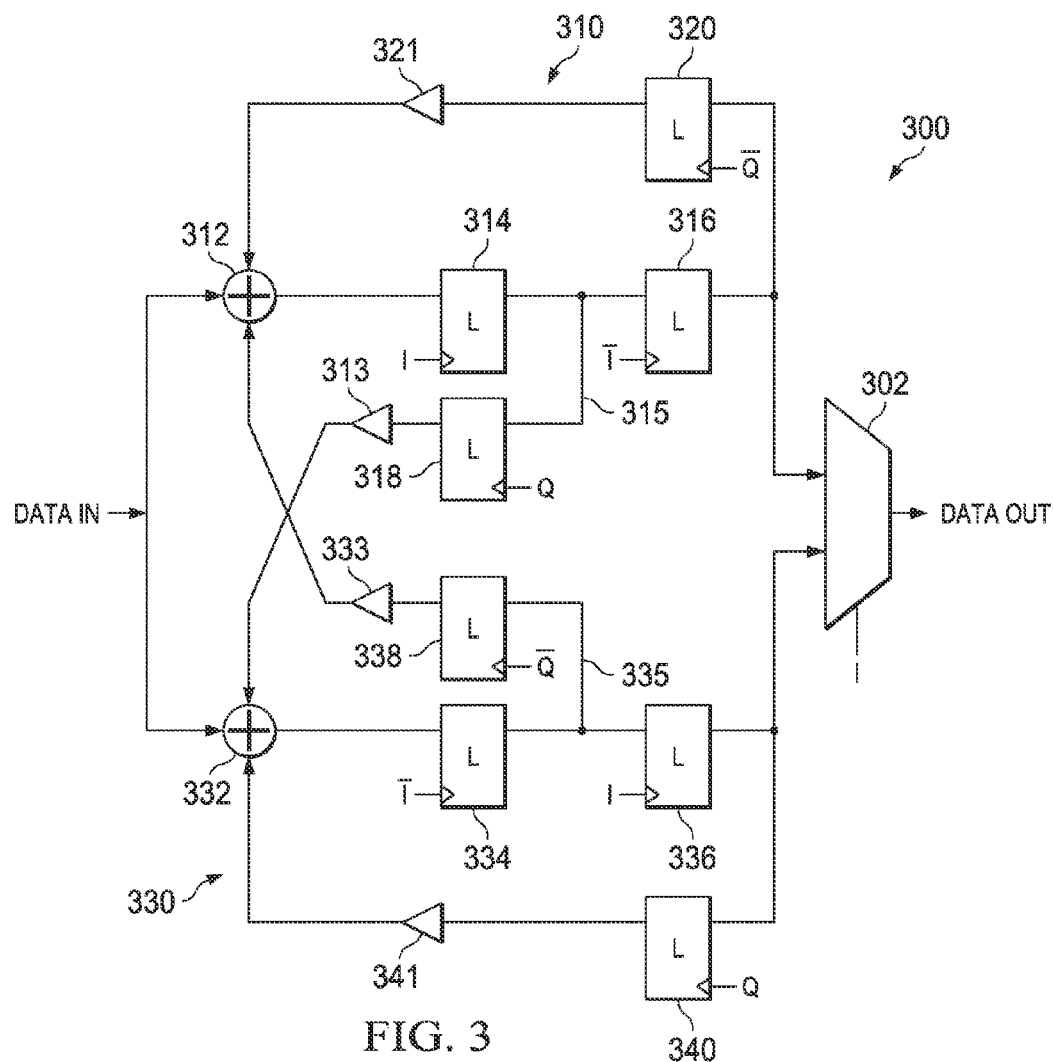
FIG. 3 shows a schematic diagram of a DFE including latched feedback in accordance with principles disclosed herein.

FIG. 3 shows a schematic diagram of a DFE circuit 300 including a latch in the feedback path in accordance with principles disclosed herein. The DFE circuit 300 includes parallel equalization paths 310 and 330. Alternate symbols of the data stream received at the input of the DFE circuit 300 are processed in each of the equalization paths 310, 320. The DFE circuit 300 allows the feedback time requirements to be relaxed relative to conventional DFE implementations. Thus, the DFE circuit 300 is a half rate implementation that allows for equalization of higher speed data streams than conventional full rate implementations on a given semiconductor process, while not requiring complex sample and hold circuitry.

The equalization path 310 includes a summing node 312, and latches 314, 316, 318, and 320. The equalization path 330 includes a summing node 332, and latches 334, 336, 338, and 340. Each of the summing nodes 312, 332 receives data from the input of the DFE circuit 300, and includes circuitry for combining feedback data with data input to the circuit 300. In equalization path 310, the latch 314 receives as input summed data from the summing node 312 and provides output 315 for input to the latches 316 and 318. Similarly, in equalization path 330, the latch 334 receives as input summed data from the summing node 332 and provides output 335 for input to the latches 336 and 338. Outputs of latches 316 and 336 are provided to a multiplexer 302, or equivalent selection circuitry, that selects/routes the outputs of the latches 316, 336 to the output of the DFE circuit 300.

The output of latch 318 is fed back into summing node 332 through a feedback path including gain stage 313 to be combined with data input to the DFE circuit 300. Similarly, the output of latch 338 is fed back into summing node 312 through a feedback path including gain stage 333. The gain stages 313, 333 scale the outputs of the latches 318, 338 to condition the feedback for combination with the data input to the circuit 300.

Each of the equalization paths 310, 330 also includes a second feed path that feeds back latched data within the equalization path. In the equalization path 310, the output of latch 320 is fed back to the summing node 312 via the gain stage 321. Similarly, in the equalization path 330, the output of latch 340 is fed back to the summing node 332 via the gain stage 341. The gain stages 321, 341 scale the outputs of the latches 320, 340 to condition the feedback for combination with the data input to the circuit 300. The polarities of the feedback signals provided from each of the gain stages 313, 321, 333, 341 can be changed in the gain stage, in the summing node, or elsewhere in the DFE circuit 300.

Figure 4:
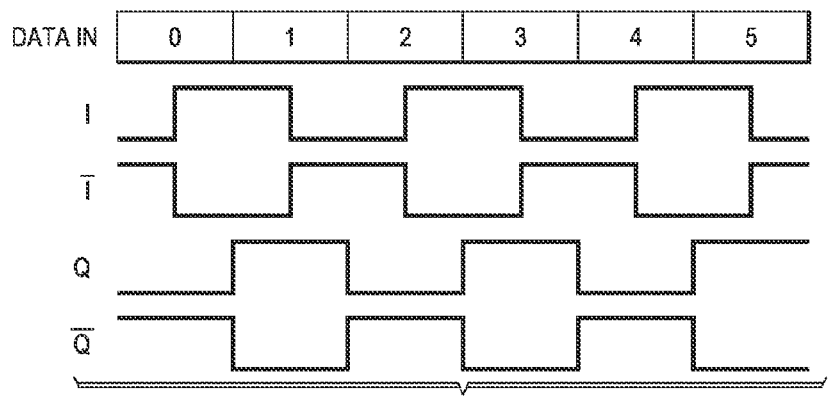
FIG. 4 shows a diagram of timing signals applied to the DFE of FIG. 3.

FIG. 4 shows the control signals applied to the DFE circuit 300. The clocks I and Q have a period that is twice the unit interval of the data input to the circuit 300. The clock I is aligned to transition at, or approximately at, the center of each unit interval. The clock Q is a quadrature phase (i.e., delayed by 90 degrees) version of clock I. Accordingly, the transitions of clock Q are aligned at, or approximately at, the edges of the unit interval.

In equalization path 310, the clock I causes the latch 314 to transparently pass the data received from the summing node 312 in the initial half of each even numbered unit interval, and to latch the data through the middle of the subsequent odd-numbered unit interval. The clock Q causes the latch 318 to transparently pass the data received from the latch 314 throughout even numbered unit intervals and to latch the received data throughout odd numbered unit intervals. Thus, the latch 318 captures the data latched by the latch 314 and aligns the feedback data over the next unit interval for combination with input data in summing node 332.

The latch 316 is clocked by an inverted version of clock I. Accordingly, latch 316 is transparent while latch 314 is latched and stores the output of latch 314 for an additional unit interval after latch 314 becomes transparent. Latch 320 is clocked by in inverted version of clock Q to latch, hold, and align the data provided from latch 318 with the subsequent even numbered unit interval. Thus, the latch 320 aligns the feedback data for combination with input data in summing node 332. Accordingly, in equalization path 310, for equalization of data in a given unit interval (e.g., unit interval 2), feedback from the immediately preceding unit interval (e.g., unit interval 1) is provided from the other equalization path 330, while feedback from the unit interval two ahead (unit interval 0) of the given unit interval is provided from equalization path 310.

Applying clock I to latch 336, clock Q to latch 340, the inverse of clock I to latch 334, and the inverse of clock Q to latch 338, the equalization path 330 operates similarly to equalization path 310 with respect to odd unit intervals. Thus, the DFE circuit 300 provides reduced implementation complexity relative to full-rate DFEs and DFEs that include sample and hold circuitry. The DFE circuit 300 advantageously increases the time available for feedback of previously received symbol data. For example, at a 25 giga-bit input rate, the DFE 300 allows 40 picoseconds for feedback, rather than 20 picoseconds as provided in conventional DFE implementations. Accordingly, the DFE 300 provides equalization at rates equivalent to that provided by a full rate architecture, but allows implementation using a less complex and less expensive semiconductor process. Further, DFEs 300, 500 use simple 50% duty cycle clocks which are easier to generate and propagate in high-speed circuitry than asymmetric clocks. For example, the DFE 100 because of the asymmetric clocks A-D employed may require higher bandwidth in the clock paths than is needed in the clock paths of the DFEs 300, 500. Additionally, in contrast to conventional DFEs, with the DFE circuit 300 feedback data need not be provided exactly at the unit interval boundary (i.e., the symbol zero crossing), but rather feedback data may advantageously be provided at any time, within margin constraints, prior to the unit interval during which the feedback data is to combined with input data.

Figure 5:
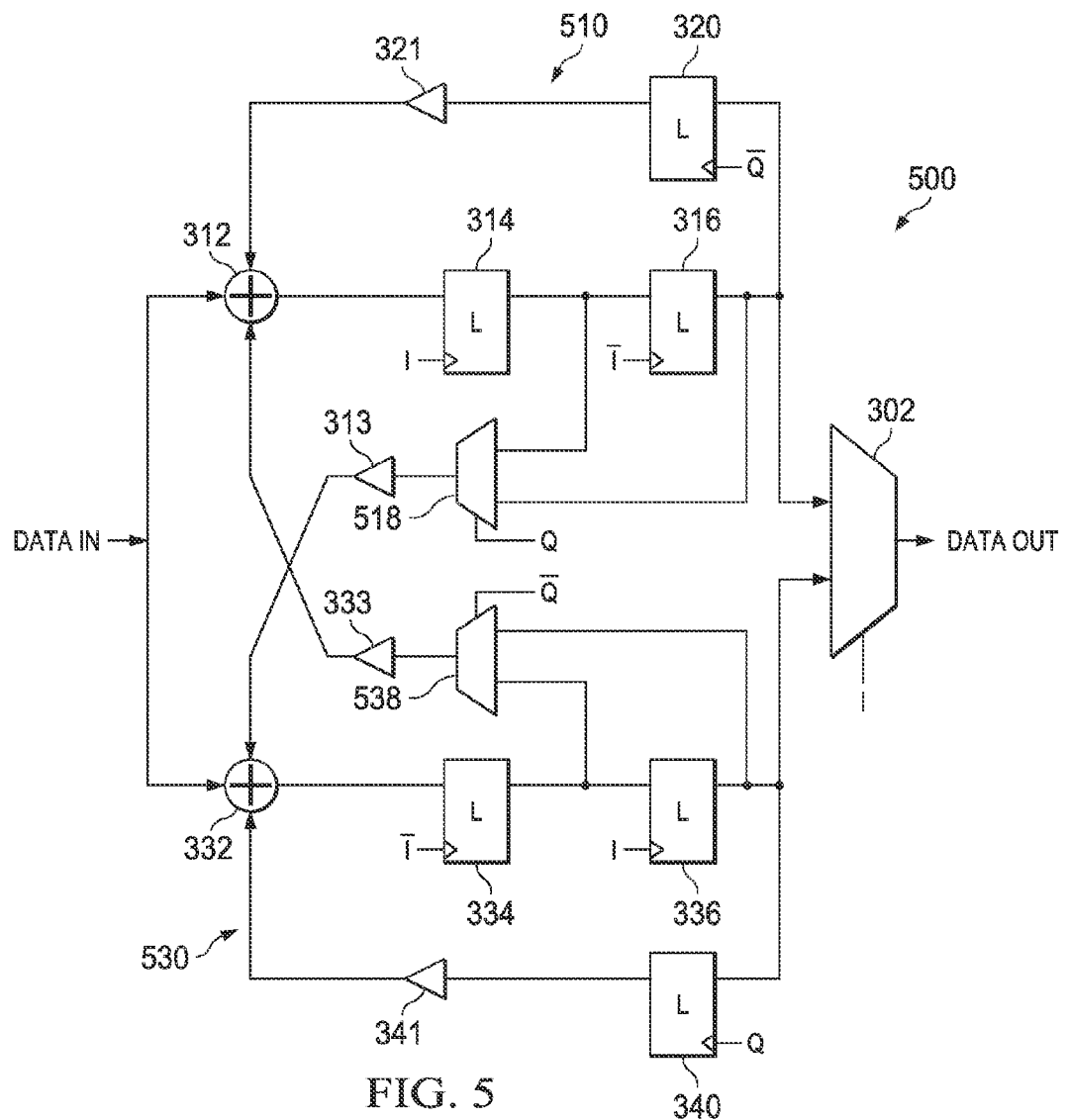
FIG. 5 shows a schematic diagram of a DFE including multiplexer feedback in accordance with principles disclosed herein.

FIG. 5 shows a schematic diagram of a DFE circuit 500 including a multiplexor in the feedback path in accordance with principles disclosed herein. The DFE circuit 500 includes parallel equalization paths 510 and 530, and is generally similar to the DFE circuit 300, but replaces the latches 318 and 338 of circuit 300 with multiplexers 518 and 538. The latches 314, 316, 320, 334, 336, and 340, the summing nodes 312, 332, and the multiplexer 302 operate as described with regard to the DFE circuit 300.

In the DFE 500, the multiplexer 518 selects from the outputs of latches 314 and 316 to generate the feedback signal provided to the summing node 332 through the gain stage 313. The clock signal Q controls selection by the multiplexer 518. The output of the multiplexer 518 is similar to the output of the latch 318 in circuit 300, and the multiplexer 518 may provide lower propagation delay than the latch 318.

The multiplexer 538 selects from the outputs of latches 334 and 336 to generate the feedback signal provided to the summing node 312 through the gain stage 333. The inverted version of the clock signal Q controls selection by the multiplexer 538 to generate an output similar to that of the latch 338 in circuit 300. Thus, the DFE circuit 500 operates in a fashion similar to, and provides the same advantages as, the DFE circuit 300.

Figure 6:
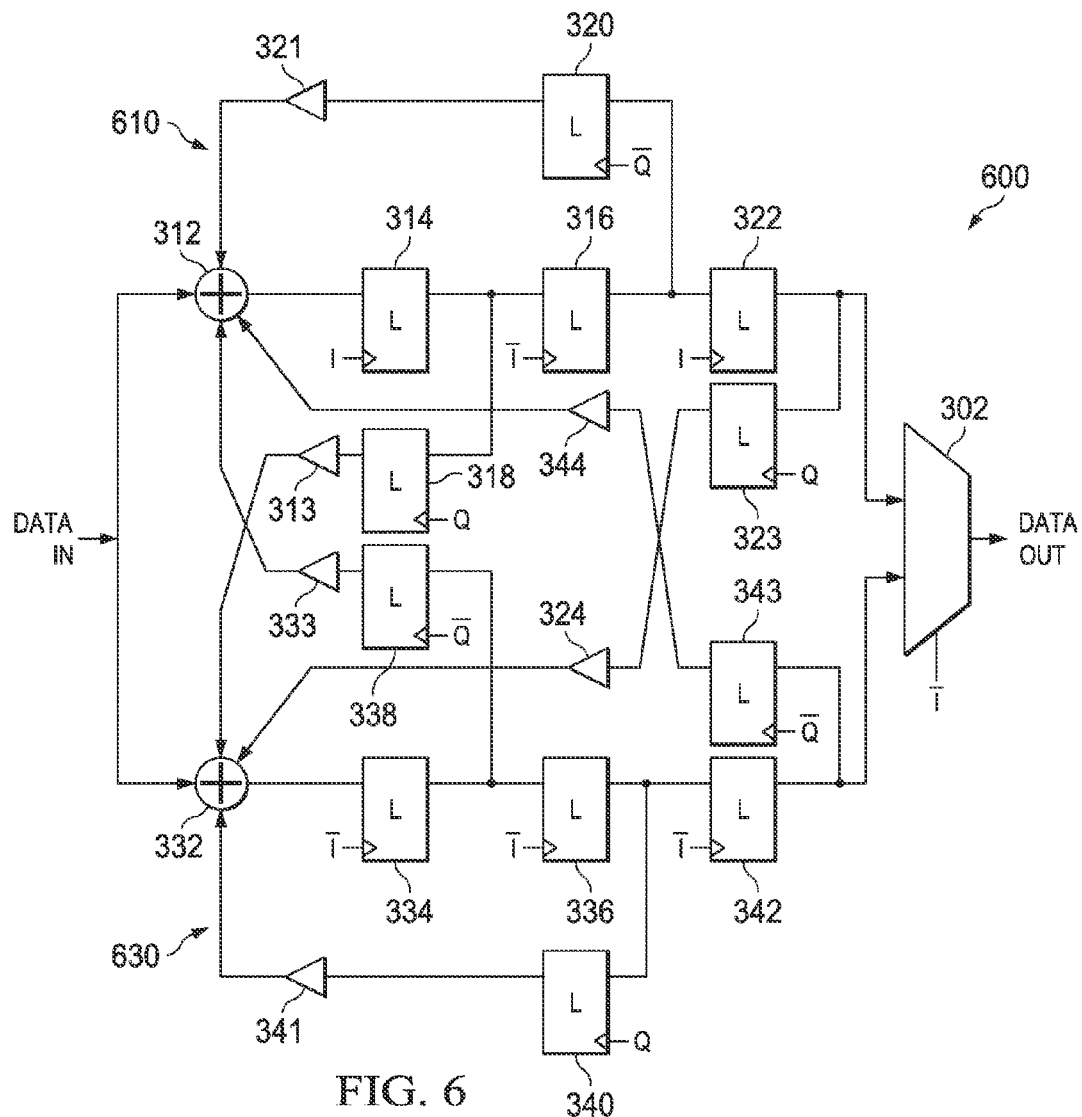
FIG. 6 shows a schematic diagram of a three tap DFE in accordance with principles disclosed herein.

While DFEs 300 and 500 employ dual tap feedback architectures, the principles disclosed herein are applicable to DFEs incorporating more than two taps. FIG. 6 shows a schematic diagram of a three tap DFE 600 in accordance with principles disclosed herein. The DFE 600 is similar to the DFE 300, and includes in each equalization path 610, 630 circuitry for a third feedback tap. In equalization path 610, the third tap includes latch 322 coupled to the output of latch 316, latch 323 coupled to the output of latch 322, and gain stage 324 fed by the output of latch 323. The output of gain stage 324 is provided to summing node 332 for combination with outputs of gain stages 313, 341, and data received from the input of the DFE circuit 600.

Similarly, the third tap of equalization path 630 includes latch 342 coupled to the output of latch 336, latch 343 coupled to the output of latch 342, and gain stage 344. The output of gain stage 344 is provided to summing node 312 for combination with outputs of gain stages 333, 321, and data received from the input of the DFE circuit 600. As explained with regard to DFE circuits 100 and 300, the polarity of the feedback signal provided from each gain stage may be changed in the gain stage, in the summing node, or elsewhere in the DFE.

Any number of additional taps may be added. For example, a fourth tap may be added by replicating the latches 316, 320, and gain stage 321 at the output of latch 322. Similarly, a fifth tap may be added by replicating the latches 322, 323, and gain stage 324 at the output of the initial latch of the fourth feedback tap. In this fashion, a DFE including any number of feedback taps may be implemented.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:
1. A decision feedback equalizer (DFE) circuit, comprising:
 a first equalization path and a second equalization path, each equalization path comprising:
  a summing node;
  a first latch configured to latch data received from the summing node;
  a second latch configured to latch data received from the first latch;

a first feedback path configured to receive data from the second latch and to provide data to the summing node of one of the equalization paths; and
a second feedback path configured to receive data from the first latch and to provide data to the summing node of another one of the equalization paths;
wherein the second feedback path provides up to a symbol interval for propagation of data between the summing nodes,
wherein the first feedback path of each equalization path comprises a third latch configured to latch data received from the second latch of the another one of the equalization paths.

2. The DFE circuit of claim 1, wherein the second feedback path of each equalization path comprises one of:
a third latch configured to latch data received from the first latch of the equalization path; and
a multiplexer configured to selectably route data received from the first latch of the equalization path and data received from the second latch of the equalization path.

3. The DFE circuit of claim 2, wherein the third latch is clocked by a clock that clocks the first latch delayed by 90 degrees.

4. The DFE circuit of claim 1, wherein:
in the first equalization path:
the first latch is clocked by a first clock having a period that is twice the symbol interval time of the data received at the input of the circuit;
the second latch is clocked by a second clock that is an inversion of the first clock; and
the second feedback path is clocked by a third clock that is a quadrature phase shifted version of the first clock; and
in the second equalization path:
the first latch is clocked by the second clock;
the second latch is clocked by the first clock;
the second feedback tap is clocked by a fourth clock that is an inversion of the third clock.

5. The DFE circuit of claim 4, further comprising a multiplexer coupled to the second latch of each equalization path, and configured to selectively route, based on the first clock, data received from the second latch of each path to an output of the circuit.

6. The DFE circuit of claim 1 wherein the summing node of each equalization path is configured to combine data received from:
an input of the circuit,
the first feedback path of the equalization path, and
the second feedback path of the equalization path.

7. The DFE circuit of claim 1, wherein, for each equalization path:
the first feedback path is configured to provide to the summing node of the equalization path, for a symbol interval, data latched by the first latch of the equalization path two symbol intervals earlier; and
the second equalization path is configured to provide to the summing node of the other equalization path, for the symbol interval, data latched by the first latch of the equalization path in an immediately prior symbol interval.

8. A decision feedback equalizer (DFE) circuit, comprising:
a first summing node coupled to a data input of the circuit;
a first latch configured to receive data from the first summing node;
a second latch configured to receive data from the first latch; and
a third latch configured to receive data from the second latch and to provide data to the first summing node;
wherein the first summing node is configured to equalize a symbol contained within the data input of the circuit by combining the data provided by the third latch with the symbol; wherein the data provided by the third latch is delayed by two symbol intervals for combination with the symbol,
wherein:
the first latch is controlled via a first clock;
the second latch is controlled via a second clock that is an inverse of the first clock; and
the third latch is controlled via a third clock that is quadrature phase version of the second clock.

9. The DFE circuit of claim 8 wherein the first clock has a period that is twice a symbol interval time of the data received at the data input of the circuit.

10. The DFE circuit of claim 8, further comprising:
a second summing node coupled to the data input of the circuit; and
a first feedback path configured to provide data to the second summing node;
wherein the first feedback path comprises one of:
a fourth latch configured to receive data from the first latch and controlled via a fourth clock that is an inverse of the third clock; and
a first multiplexer configured to selectably route data from the first latch and the second latch based on the fourth clock.

11. The DFE circuit of claim 10, further comprising:
a fifth latch configured to receive data from the second summing node;
a sixth latch configured to receive data from the fifth latch; and
a seventh latch configured to receive data from the sixth latch and to provide data to the second summing node;
wherein the second summing node is configured to:
combine data received from the first feedback path, data received from the seventh latch, and data received from the data input of the circuit; and
provide the combined data to the fifth latch.

12. The DFE circuit of claim 11, wherein:
the fifth latch controlled via the second clock;
the sixth latch is controlled via the first clock; and
the seventh latch is controlled via an inverted version of the third clock.

13. The DFE circuit of claim 11, further comprising:
a second feedback path configured to provide data to the first summing node;
wherein the second feedback path comprises one of:
an eighth latch controlled via the third clock and configured to receive data from the fifth latch; and
a second multiplexer configured to selectably route data from the fifth latch and the sixth latch based on the third clock;
wherein the first summing node is configured to:
combine data received from the third latch, data received from the second feedback path, and data received from the data input of the circuit; and
provide the combined data to the first latch.

14. The DFE circuit of claim 11, further comprising an output multiplexer configured to selectably route data from the second latch and the sixth latch to an output of the circuit based on the first clock.

15. A decision feedback equalizer (DFE) circuit, comprising:
  parallel equalization paths configured to equalize alternate bits of an input data stream;
  wherein a first of the equalization paths, comprises:
    a summing node;
    a first latch configured to latch data received from the summing node; and
    a second latch configured to latch data received from the first latch;
    wherein:
      the first latch is configured to transparently pass the data received from the summing node during a first half of every even numbered bit interval and to latch the data when not transparently pass the data; and
      the second latch is configured to latch data received from the first latch during the first half of the every even numbered bit interval and to transparently pass data from the first latch when not latching the data.

16. The DFE circuit of claim 15, wherein:
  a second of the equalization paths, comprises:
    a summing node;
    a first latch configured to latch data received from the summing node; and
    a second latch configured to latch data received from the first latch;
    wherein:
      the first latch is configured to be transparently pass the data received from the summing node during a first half of every odd numbered bit interval and to latch the data when not transparently pass the data; and
      the second latch is configured to latch data received from the first latch during the first half of the every odd numbered bit interval and to transparently pass data from the first latch when not latching the data.

17. The DFE circuit of claim 16, wherein the summing node of each of the equalization paths is configured to:
  receive input data to the circuit;
  combine the input data with feed back data received from the first latch of the other of the equalization paths; and
  provide the combined data to the first latch of the equalization path.

18. The DFE circuit of claim 17, further comprising a multiplexer configured to:
  selectively route data from the second latch of each of the equalization paths to an output of the circuit; and
  change the second latch selected at approximately a center of each bit interval.

* * * * *